United States Patent [19]

Holzner et al.

[11] Patent Number: 4,503,496
[45] Date of Patent: Mar. 5, 1985

[54] MULTI-MICROCOMPUTER SYSTEM WITH DIRECT STORE ACCESS

[75] Inventors: Peter Holzner, Germering; Werner Sedlmeier, Munich, both of Fed. Rep. of Germany

[73] Assignee: Siemens Aktiengesellschaft, Berlin and Munich, Fed. Rep. of Germany

[21] Appl. No.: 347,695

[22] Filed: Feb. 11, 1982

[30] Foreign Application Priority Data

Feb. 11, 1981 [DE] Fed. Rep. of Germany ....... 3104928
Feb. 11, 1981 [DE] Fed. Rep. of Germany ....... 3104903

[51] Int. Cl.³ ............................ G06F 15/16; G06F 13/00
[52] U.S. Cl. .................................................. 364/200
[58] Field of Search ............................. 364/200, 900

[56] References Cited

U.S. PATENT DOCUMENTS

| 4,059,851 | 11/1977 | Nutter, Jr. ............................ 364/200 |
| 4,151,592 | 4/1979 | Suzuki et al. ......................... 364/200 |
| 4,214,305 | 7/1980 | Tokita et al. ......................... 364/200 |
| 4,224,665 | 9/1980 | de Bijl et al. ......................... 364/200 |
| 4,231,086 | 10/1980 | Tarbox et al. ........................ 364/200 |
| 4,257,099 | 3/1981 | Appelt ................................. 364/200 |
| 4,271,466 | 6/1981 | Yamamoto et al. .................. 364/200 |
| 4,285,037 | 8/1981 | Von Stetten ......................... 364/200 |
| 4,285,038 | 8/1981 | Suzuki et al. ......................... 364/200 |
| 4,422,142 | 12/1983 | Inaba et al. .......................... 364/200 |

Primary Examiner—Gareth D. Shaw
Assistant Examiner—Jameson Lee
Attorney, Agent, or Firm—Hill, Van Santen, Steadman & Simpson

[57] ABSTRACT

The invention relates to a multi-microcomputer system employing a direct memory access controller for direct memory access. The data buses and address buses of the several microcomputers are interconnected by means of bus separator stages which normally isolate the buses, but enable the buses to communicate with each other during data exchange between the read-write stores of the individual microcomputers. The microprocessors are switched into their HOLD state during data exchange, and the data exchange is effected via the DMA controller which is supplied with the address zones of the source and destination by a designated microcomputer. In order to increase operational reliability, two or more multi-microcomputer systems, each containing a DMA controller, can be connected in parallel.

10 Claims, 7 Drawing Figures

MULTI-MICROCOMPUTER SYSTEM WITH DIRECT STORE ACCESS

BACKGROUND OF THE INVENTION

1. Field of the Invention

The present invention relates to a multi-microcomputer system, and more particularly to such a system having direct memory access capability.

2. The Prior Art

When the tasks required of digital computers exceed the capacity of a single computer, but is nevertheless so complex as to prevent distribution between a plurality of independently operating units, a multi computer system is used. In many fields, microcomputers have replaced the large computers previously in use. The small dimensions of the microcomputers allow the production of compact multi-microcomputer systems.

The magazine "Elektronik", 1979 July 20 Pgs. 73–77, describes bus structures for multi computer systems. In one arrangement described in the above publication, the multi computer system has a dialogue computer and a plurality of function computers. The dialogue computer is assiged a direct memory access (DMA) controller, which facilitates direct access to the read-write stores of the interconnected computers. The DMA controller facilitates direct access to the read-write stores of the dialogue computer, via the address bus and the data bus. The data bus of the dialogue computer is connected to the DMA controller and to the data buses of the function computers by way of separator stages or gates. The address buses used by the dialogue computer are operated by separate address generators, which involve an increased complexity and expense in the system. In addition, access to the storage is slowed down because of the necessity for time coordinating the functions of the DMA controller.

In a system in which the reliability requirements are high, in which no breakdowns of any unit can be tolerated, a second computer system is provided which performs the identical functions in parallel. Monitoring the circuits and monitoring programs are provided to insure that the operating program is carried out by one of the parallel computer systems. The redundant system can either operate in a stand-by mode until required, or in a hot stand-by mode, or can process the functions in continuous parallel operations simultaneously with the active system.

In the event of a breakdown in the active system, a stand-by operation leads to longer interruption times because larger quantities of data must be exchanged between the system which was formerly active, and the stand-by unit. In a hot stand-by mode, the store of the inactive computer is written into at regular intervals by the active computer, so that it stores some of the data of the on-going programs. This procedure has the disadvantage, however, that in the event of an error in the active system which is not yet detected, the data in the stand-by system may be faulty. Therefore, the method of continuous parallel operation should be given preference, because any differences in the results of the processes of parallel operations immediately identify errors. In continuous parallel operation, since the data content of both systems is identical, there is no difficulty occurring as a result of a transistion from one system to another in the event of a breakdown in one system. In the case of a harmless fault, such as a parity error in a memory read, it is sufficient to transfer a small number of bytes from one system to another in order to bring the stores of the two systems to the same data state. In the case of a serious fault in one system, or in the case of restarting the system following repairs, it can be necessary to transfer large blocks of data or even the entire content of the storage of one of the systems.

In the system described in the publication referred to above, the dialogue computer alone programs the DMA controller. This results in a master-slave arrangement, which is not desireable. In order to avoid this disadvantageous relationship, a separate bus computer is necessary, which likewise, however, must be provided in duplicate for reliable operation of the overall system.

The German Patent AS No. 2,749,226 discloses a data exchange control unit for two microcomputers. As they are disclosed, the data exchange takes place by means of first-in-first-out storage devices. Such storage devices, however, are unsuitable for the transfer of large quantities of data.

SUMMARY OF THE INVENTION

It is a principle object of the present invention to provide a multi-microcomputer system which, with a minimum of complexity, facilitates a rapid exchange of data between the microcomputers of a multi-microcomputer system.

This object is realized in the present invention by connecting the address buses of the several microcomputers through bus separator stages to the address bus of the DMA controller. A number of control lines are provided for controlling the bus separator stages so that the address and data buses can be interconnected between the microcomputers which exchange data. Additional control lines are connected between the microcomputers and the DMA controller which determine the direction of data exchanged between the read-write stores of the microcomputers, in accordance with memory read and memory write commands.

In one embodiment of the present invention, the data buses and the address buses of the microcomputers are all interconnected via separator stages. This results in an optimally rapid data exchange using the DMA controller. The programming of the DMA controller, such as the address zones of the memory which is to be read, is generally accomplished by the first microcomputer, to which the DMA controller is assigned. Data exchange can take place between the read-write stores of any computers in the system. The read-write control, during data exchange, is controlled by the DMA controller.

In a particular embodiment of the present invention, the read-write store of each of the microcomputers has a read-write logic circuit, which produces a read command or a write command to its assigned read-write store. An output unit is also provided for producing direction signals which are connected to inputs of the read-write logic circuits. The read-write logic circuits also receive read and write signals from the DMA controller which are logic-linked with the direction signals. The DMA controller produces a HOLD request signal which is connected to the HOLD inputs of the microcomputers and a control logic unit which assemblies the HOLD acknowledge signals from the microcomputer, gates them together and connects the result to the corresponding bus separator stages and to the HOLD acknowledge input of the DMA controller for the implementation of the data exchange. This arrangement results in a particularly simple multi-microcomputer system.

In a more detailed embodiment of the present invention, there is a second AND gate interconnected between the output of the HOLD control logic and the HOLD acknowledge input of the DMA controller, such gate having a second input connected to the output of an OR gate supplied with direction signals from the output unit. This circuit arrangement determines that all microprocessors of the microcomputers are switched into their HOLD states and that write direction signals are present before the data exchange takes place via the DMA controller. Following data exchange, which is controlled only by the DMA controller, the system buses are cut off again so that the computers of the systems can again operate independently of each other.

In order to increase the operating reliability by means of a parallel operating multi-microcomputer system, it is expedient for a first microcomputer of each of the parallel systems to be assigned a DMA controller and system buses interconnecting the microcomputers of the first system via bus separator stages, with a similar arrangement for the parallel system, and with further system bus separator stages between the two parallel systems. All of the microprocessors of the parallel systems are brought to their HOLD state, and the data exchange between the read-write stores of the two systems is controlled by the DMA controller of one system, with the DMA controller of the parallel system being inactive.

In this realization of the present invention, it is advantageous that the several computers of the two parallel systems are interconnected via bus separator stages to form a multi microprocessor system in which the microcomputers can operate independently of each other, with the data exchange between the individual computers of the multi-microcomputer system taking place under control of only one DMA controller in each computer system. In this way, it is possible to accomplish a rapid data exchange between the working stores of the individual computers and also a rapid data exchange between the multi-microcomputer systems. Of course, it is also possible to use the present invention in a system which uses more than two or only one microcomputer in a computer system.

In order to further increase the operating reliability, it is advantageous for more than two microcomputer or microcomputer systems to be connected in parallel via further system bus separator stages. If, for example, three parallel operating computer systems are selected, a number of monitoring circuits and monitoring programs can be dispensed with since the monitoring can be effected on the basis of a simple majority decision among the three units. It is advantageous fo the data exchange to be controlled by the DMA controller of the microcomputer or the multi-microcomputer system which receives the data, in order to avoid the transfer of faulty data. In the event of a breakdown in one system or of one DMA controller, the data exchange to or from the faulty system is suppressed.

It is expedient that monitoring devices are provided which, in the occurrence of a fault, instigate an exchange of data from the error-free system into the faulty system. In this way, the components of the faulty system which continue to operate normally may be supplied with error-free data and continue their operation.

By the use of monitoring circuits, it is possible to dispense with the use of a third parallel operating computer or a third parallel operating multi computer system. In this case the monitoring circuits are designed either as hardware monitoring units or software monitoring units. For example, hardware monitoring units can examine signal levels, etc., and software monitoring units can examine the time required to execute certain routines. Either type of monitoring units can compare the results of operations in two parallel systems to identify differences which signal a fault in one system, or a parity failure in either system.

It is effective to assign a different address zone to the read-write stores of each microcomputer within a microcomputer system. This makes it possible to approach the read-write stores of the various computers without any further circuit complexity. During data exchange, addresses in the source and destination read-write stores of the computer systems which are connected to one another are uniquely identified, which facilities an optimumly speedy and simple data exchange. Naturally, it is also possible to use identical address zones in different read-write stores of a computer system, which are then operated by further circuitry measures such as chip select inputs of the memory units. In special circumstances, it is possible to use identical address zones in two read-write stores assigned to different microcomputers, in order to obtain a speedy data exchange between identical store positions within the stores. In this case, the source and destination addresses are identical.

These and other objects and advantages of the present invention will become manifest by a review of the following description and the accompanying drawings.

BRIEF DESCRIPTION OF THE DRAWINGS

Reference will now be made to the accompanying drawings in which.

DESCRIPTION OF THE PREFERRED EMBODIMENTS

Figure 1:
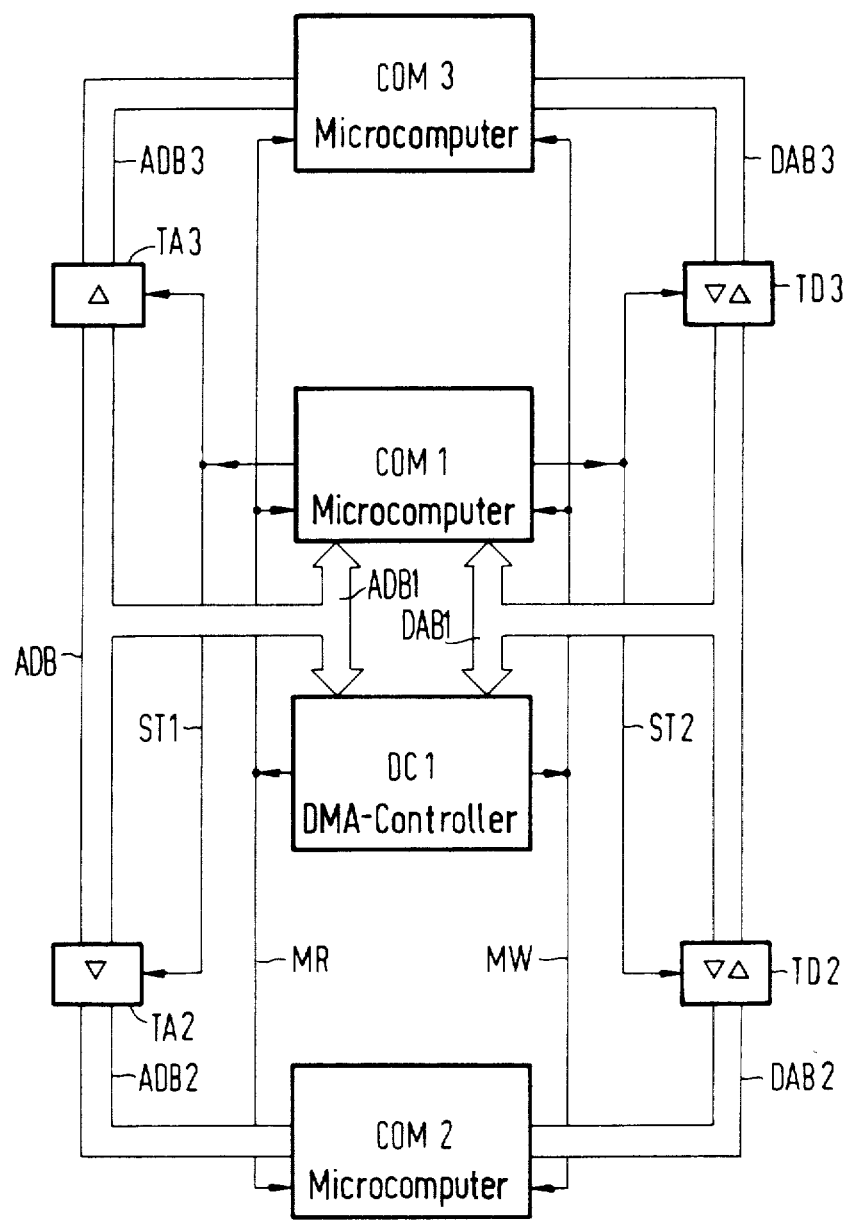
FIG. 1 is a functional block diagram of a multi-microcomputer system constructed in accordance with one embodiment of the present invention.

Referring now to FIG. 1, a functional block diagram of a multi-microcomputer system incorporating an illustrative embodiment of the present invention is illustrated. The multi-microcomputer system incorporates three microcomputers COM1, COM2, and COM3. The first microcomputer COM1 is assigned a direct memory access (DAM) controller DC1, which is connected thereto via an address bus ADB1 and a data bus DAB1. All ports connected to the buses operate in a three-state mode, so that any bit may be high or low, or may be floating in a high impedance state. Each microcomputer contains its own program store and its own read-write store. The address bus ADB2 of the second microcomputer COM2 is connected by way of a first address bus separator stage TA2 with the address bus ADB1 and the data bus DAB2 of the second microcomputer is connected through a bus separator stage TD2 to the corresponding bus DAB1. The DMA controller can consist, for example, of module AM 9517, produced by Advanced Micro Devices of Sunnyvale Calif. The microcomputer may incorporate any of a variety of commercially available microprocessors, such as the well-known 8085 or the Z80.

The address bus ADB3 of a third microcomputer COM3 is connected by an address bus separator stage TA3 to the bus ADB1, and a separator stage TD3 separates the data bus DAB3 of the third microcomputer COM3 from the data bus DAB1. The address bus separator stages TA2 and TA3 are connected to a control line ST1 which is connected to a control output of the microcomputer COM1. The separator stages TD2 and TD3 are connected to a control line ST2 which originates with a further control output of the microcomputer COM1. The DMA controller DC1 supplies signals designating memory read and memory write, MR and MW, which are supplied to all three of the microcomputers, and to their read-write stores which are not explicitly shown in FIG. 1. It will be clear that additional conventional details such as control logic circuits, input-output units, etc., are required for the functional operation of the apparatus of FIG. 1.

All three microcomputers COM1, COM2 and COM3 can operate independently of each other if the bus separator stages isolate their respective buses. In this case the DMA controller DC1 is still available to the first microcomputer COM1 in order to be able to exchange data within its own read-write store.

The data exchange between the first microcomputer COM1 and the second microcomputer COM2 is carried out by the DMA controller DC1. For this purpose, the microcomputers COM1 and COM2 are both switched into their HOLD states via suitable control lines (not shown in FIG. 1) in which the output ports of COM1 and COM2 which are connected to the address bus ADB1 and the data bus DAB1 are brought to their high impedance state. The DMA controller DC1 is thus able to control the data exchange between the read-write memories within the first computer COM1 and the second computer COM2. The address zones are determined by the first computer COM1. During the data exchange, the address bus separator stage TA2 and the data bus separator state TD2 are rendered conductive, to establish conductive paths for addresses and data between the address buses ADB1 and ADB2 and the data buses DAB1 and DAB2.

In the event of an exchange of data from the read-write store of the second microcomputer into the read-write store of the first microcomputer, the DMA controller DC1 first applies the read address applying to the data source to the read-write store of the second computer COM2. With the aid of the memory read signal MR, the source word or byte is read out and is initially transferred to a temporary store within the DMA controller DC1. The DMA controller DC1 then outputs the write address to the read-write memory of the microcomputer COM1, together with the memory write signal MW, so that the data is written from the temporary store into the read-write memory of the first microcomputer COM1.

An exchange of data between the second microcomputer COM2 and the third microcomputer COM3 can take place in a similar manner. However, during this period of time, the address bus ADB1 and the data bus DAB1 must be released by the first microcomputer COM1, by placing the computer COM1 in its HOLD state. Naturally, it would be conceivable to provide further bus separator stages between the first computer COM1 and the DMA controller DC1, in which case, however, a control module such as a further microcomputer is needed to control the DMA controller. It is also possible to logic link the read and write signals to additional control signals in order to access the desired read-write stores.

Figure 2:
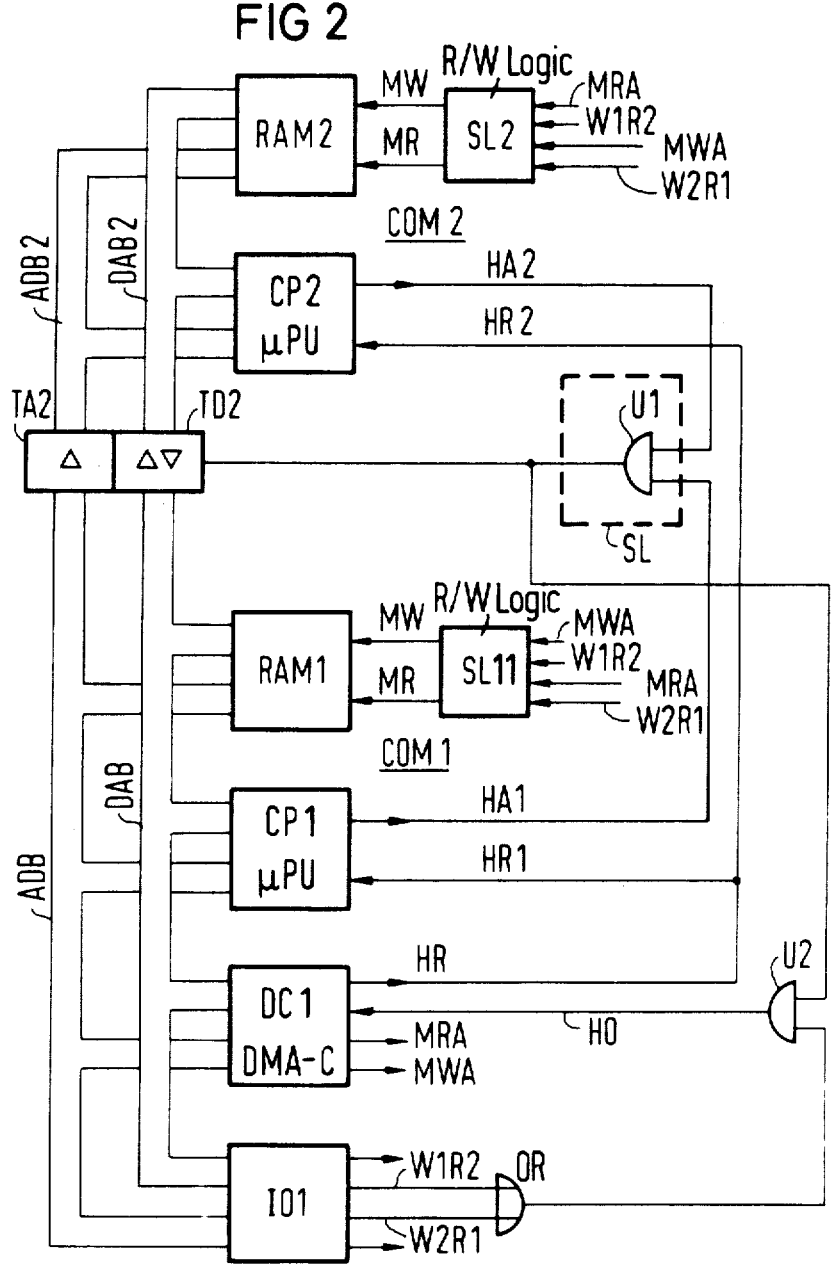
FIG. 2 is a functional block diagram of a more detailed embodiment of a two microcomputer system.

FIG. 2 shows a more detailed embodiment of the invention for two microcomputers. The first microcomputer COM1 contains a microprocessor CP1 with a self-contained program store and a read-write store RAM1. The program may be located in a physically separate IC from the microprocessor (within the box CP2 in FIG. 2) and in that event all of its bus-connected outputs assume a high impedance state at the same time that the outputs of the microprocessor do so. Accordingly, the program store is treated herein as being part of the microprocessor unit. The first microcomputer is assigned a DMA controller DC1 and an input/output unit IO1. The input/output unit may be a commercially available unit such as Model 8255 produced by Intel Corporation. The microprocessor CP1, its read-write memory RAM1, the DMA controller DC1, and the input/output unit IO1 are all interconnected by a address bus ADB1 and a data bus DAB1. The conventional control bus, and other obvious control lines, are not illustrated in FIG. 2 for the sake of clarity.

The second microcomputer COM2 has a second microprocessor CP2 with a self-contained program store and a second read-write store RAM2. CP2 and RAM2 are interconnected by an address bus ADB2 and a data bus DAB2. The address buses ADB1 and ADB2 are interconnected through an address bus separator stage TA2, and the data buses DAB1 and DAB2 are interconnected via a data bus separator stage TD2. Each read-write memory RAM1 and RAM2 has a read-write logic circuit SL11 and SL21 respectively. Each logic circuit develops memory read and memory write signals MR and MW, which are connected to the inputs of the read-write store.

A control logic unit SL has an AND gate U1 having inputs connected to the HOLD acknowledge outputs HA1 and HA2 of the microprocessors CP1 and CP2. The output of the AND gate is connected to the control inputs of the bus separator stages TA2 and TD2.

A HOLD request output HR of the DMA controller DC1 is connected to the HOLD request inputs HR1 and HR2 of the first and second microprocessors.

The output of the control logic SL is also connected via an AND gate U2 to the HOLD acknowledge input HO of the DMA controller DC1. The second input of the AND gate U2 is connected to the output of an OR gate or which receives inputs from the input/output unit IO1. These outputs are W1R2 and W2R1, which signal the direction which data transfer is to take place. These signals are also supplied directly to the read-write logic units SL11 and SL21. Further outputs of the input/output unit IO1 are indicated by arrows in FIG. 2.

Two further outputs of the DMA controller supply memory read and memory write signals MR1 and MW1, which are connected to the read-write logic units SL11 and SL21.

In FIG. 2, the data exchange is triggered by the microprocessor CP1 of the first microcomputer COM1. This can be effected by means of an interrupt signal applied to a hardware interrupt terminal of the microprocessor CP1, or by the use of conventional interrupt or other software. The DMA controller DC1 is supplied, by the microprocessor CP1, with the addresses of the store zones for the desired memory exchange. Then the DMA controller is started up for the data exchange from the source read-write store to the destination read-write store. The DMA controller produces a HOLD request signal HR which is supplied to both microprocessors, and maintains them in their HOLD state, with a high impedance state on the address and data ports. The HOLD acknowledge signals HA1 and HA2 are combined in control logic SL, and supplied to the AND gate U2 for further sending a HOLD acknowledge signal to the DMA controller on the line HO, provided that a write direction signal is supplied to the AND gate U2 through the OR gate OR by the IO unit IO1. The DMA controller issues memory read and memory write commands MR and MW, following reception of the HOLD acknowledgement signal on the line HO, and the data exchange is thereby carried out between the read-write stores RAM1 and RAM2. The bus separator stages TA2 and TD2 are made conductive by the output of the control logic unit SL, during the data exchange.

At the end of the data exchange, the DMA controller DC1 withdraws the hold request signal HR, and the microprocessors CP1 and CP2 withdraw their HOLD acknowledgement signals, and the bus separation is reimplemented by deactivating the output from the control logic SL. The two microcomputers COM1 and COM2 can then operate independently of each other.

Figure 3:
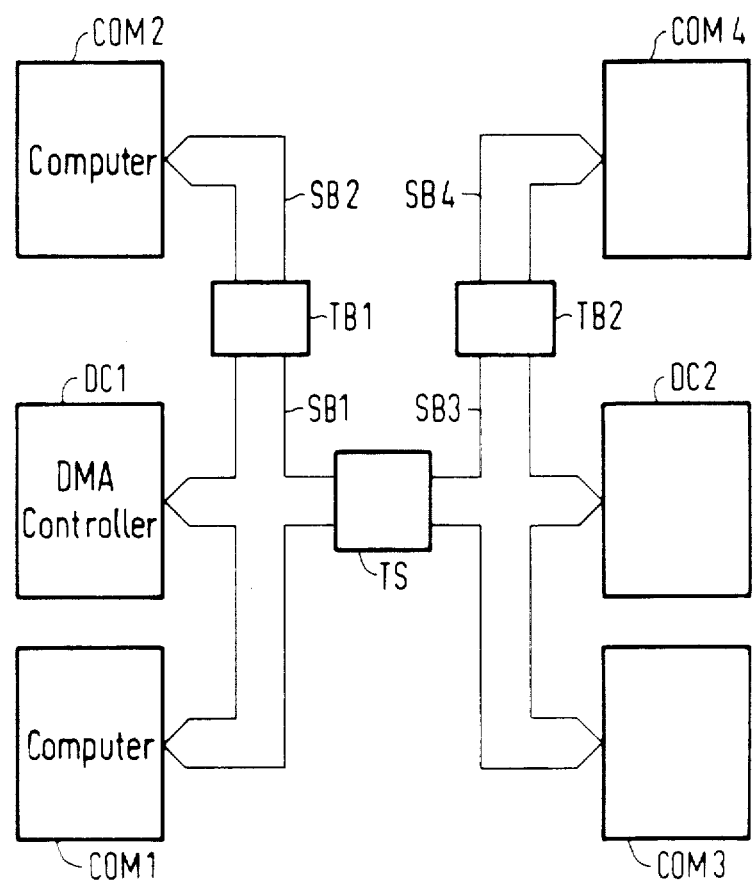
FIG. 3 is a functional block diagram of the data exchange relationship between two parallelly connected multi-microcomputer systems.

FIG. 3 illustrates the interconnection of two multi-microcomputer systems. One multi-microcomputer system contains system buses SB1 and SB2, each containing a data bus, an address bus, and a control bus, which are interconnected by a system bus separator stage TB1. The second multi-microcomputer system has similar buses and a bus separator stage TB2. The system buses SB1 and SB3 are interconnected by a system bus separator stage TS. As shown in FIG. 3, each system has two microcomputers CM, and a DMA controller DC associated with one of the microcomputers.

Each of the microcomputers COM1–COM4 can operate independently of each other, and data exchange between individual storage zones of the read-write stores of the microcomputers can take place at high speed with the aid of the DMA controllers DC1 and DC3. If a data exchange is to take place between the two microcomputers COM1 and COM2, those two microcomputers are switched into their HOLD state, so that the ports connected to the buses are switched into their high impedance state. The DMA controller DC1 is then activated for executing the data transfer, whereas the second DMA controller DC3 remains passive. The data exchange between the read-write stores or the first and second microcomputers COM1 and COM2 is controlled by the first DMA controller DC1 and the data buses of the two computers are connected via the separator stage TB1. On the completion of the data exchange, the system buses SB1 and SB2 of the two microcomputers are cut off again.

The data exchange between the two multi-microcomputer systems of FIG. 3 takes place in a similar manner. Here, when data exchange is to take place between computers COM2 and COM4, the bus separation between SB2, SB1, SB3 and SB4 is discontinued, by establishing electrical connections between applicable lines of the buses through TB1, TB2, and TS. In the store content of the read-write store, the fourth computer COM4 can be transferred into the read-write store of the second computer COM2, using one of the two DMA controls DC1 or DC3. Preferably, DC1 is used.

Figure 4:
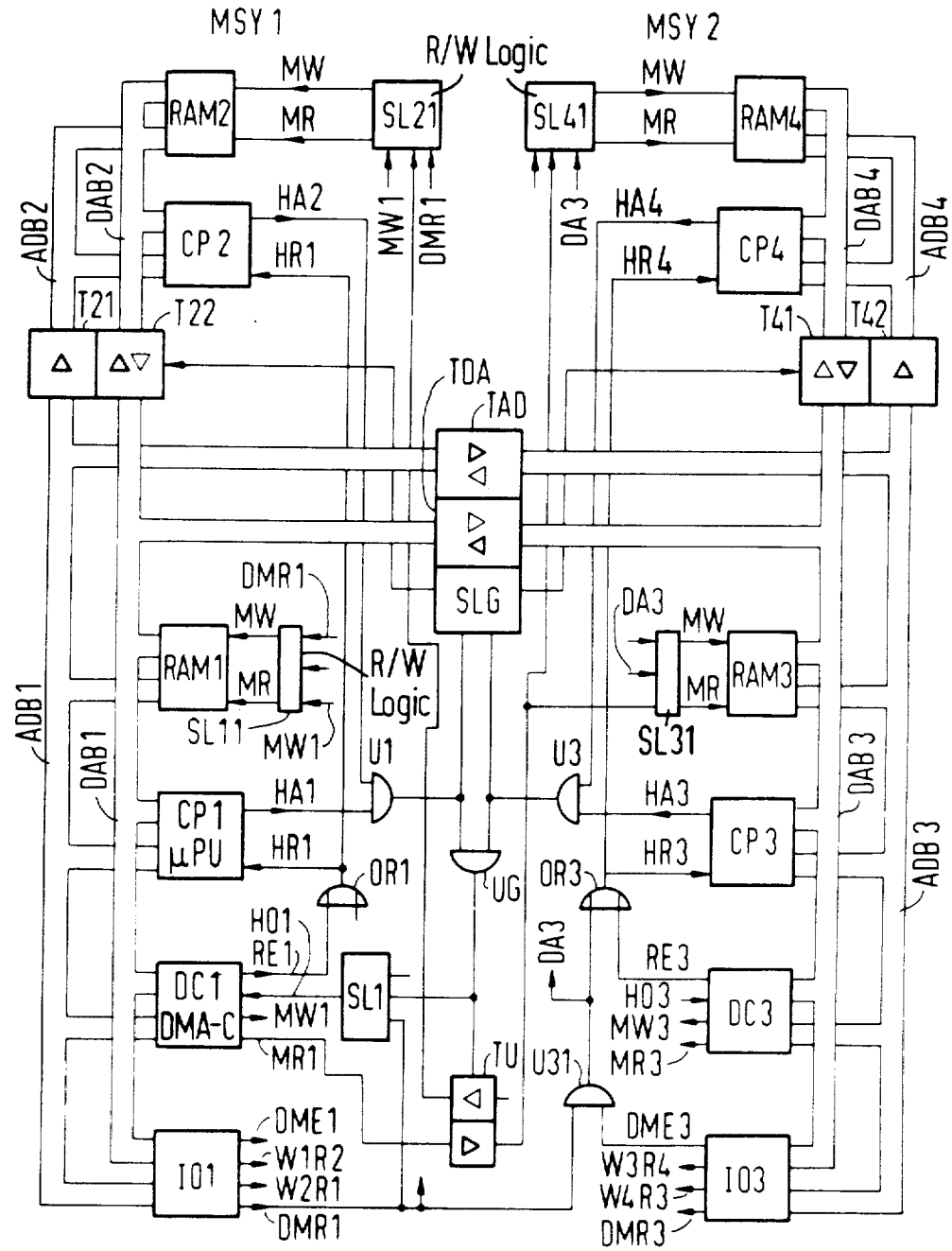
FIG. 4 is a functional block diagram of one embodiment of parallelly connected multi-microcomputer systems.

FIG. 4 represents a more detailed functional block diagram of two coupled multi-microcomputer systems. The first system MSY1 has a first microprocessor CP1 with internal program storage which is connected by a first address bus ADB1 and a first data bus DAB1 to an associated read-write store RAM1. The first microprocessor CP1 is assigned to first DMA controller DC1. The DMA controller can consist, for example, of Model No. 9517 produced by Advanced Micro Devices of Sunnyvale, Calif.

An input/output unit IO1 (which may be, for example, Model No. 8255 produced by Intel Corporation) is also provided which is likewise connected to the address bus ADB1 and the data bus DAB1. For the sake of clarity, certain conventional control lines have not been illustrated in FIG. 4.

A second microcomputer is connected by bus separator stages T21 and T22 to the first address bus ADB1 and the first data bus DAB1. This includes the second microprocessor CP2 with internal program store and with a second read-write store RAM2. Each read-write store is assigned a read-write logic circuit SL11 and SL21 respectively. Each read-write logic circuit has two outputs for manifesting the memory read and memory write signals MR and MW. These outputs are connected to the corresponding inputs of the associated read-write store.

The data exchange is controlled by control signals which are produced by the DMA controller DC1 and the first input/output unit IO.

The HOLD request signal RE1 produced by the DMA controller DC1 is connected through and OR gate OR1 to the HOLD request inputs HR1 and HR2 out of the first and second microprocessors CP1 and CP2. The HOLD acknowledge outpus HA1 and HA2 are connected from the microprocessors to the inputs of an AND gate U2, the output of which is connected to an input of a control logic unit SLG, common to both the multi-microcomputer systems of FIG. 4. The output of the gate U1 is also connected to one input of an AND gate UG which is common to both multi-microcomputer systems. The output of this gate is connected to a HOLD logic circuit SL1 and to a separator stage TU. The DMA request signal DMR1, produced as an output of the input/output unit IO1, is connected to the HOLD control logic circuit SL1. The output of the HOLD control logic circuit is connected to the HOLD acknowledge input of the first DMA controller DC1.

A memory write output MW1, produced by the first DMA controller DC1, is connected through one input of each of the read-write logic circuits SL11 and SL21. Each of the read-write logic circuits SL12 and SL21 has a further input connected to the direct memory access request output DMR1 of the input/output unit IO1. The input/output unit also produces a direct memory access enable signal DME3 by an AND gate (not shown) the output of which is connected to further inputs of the read-write logic circuits SL11 and SL21.

Figure 5:
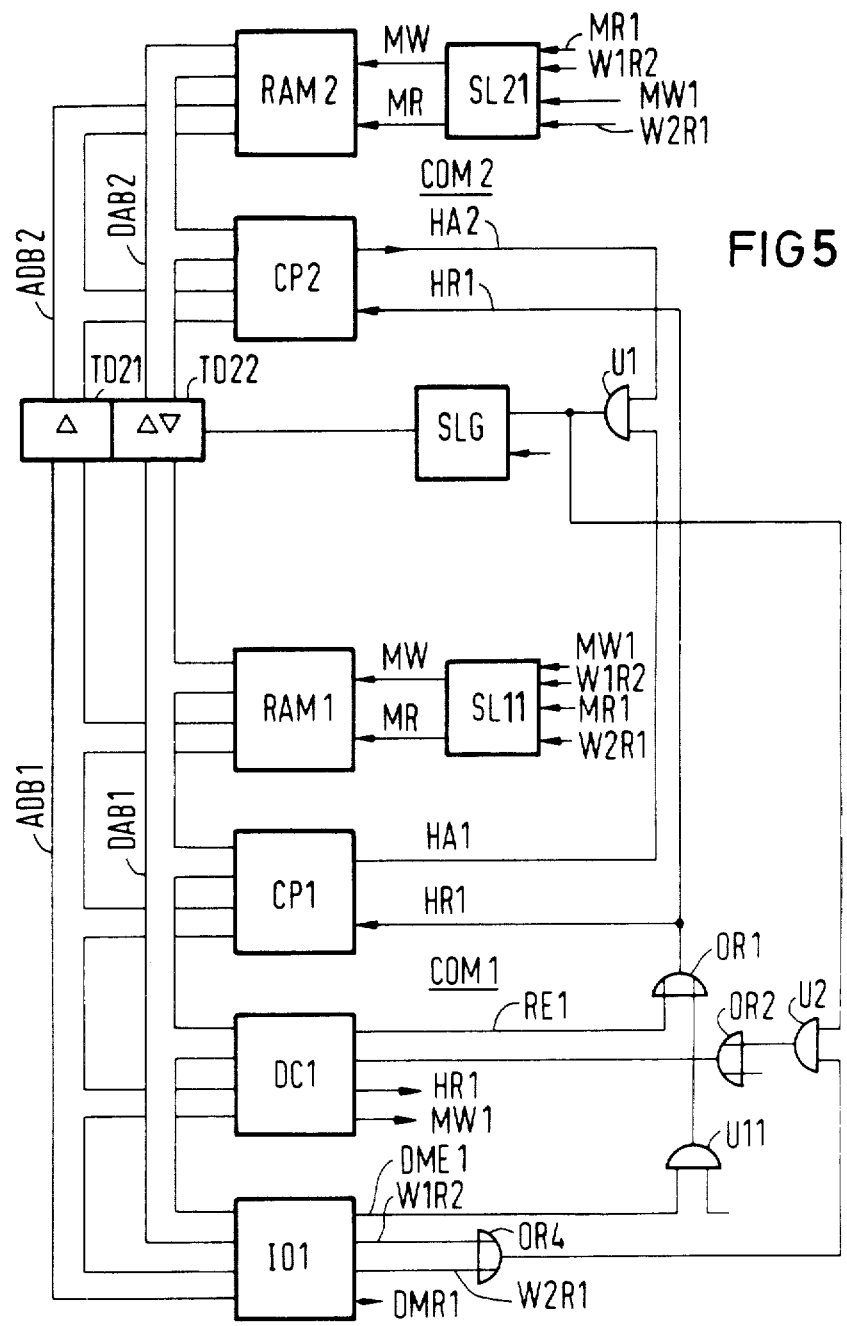
FIG. 5 illustrates a more detailed diagram of a portion of the system of FIG. 4.

The first input/output unit IO1 also produces write direction signals W1R2 and W2R1, which are also connected to further input of the read-write logic circuits (as shown in FIG. 5).

A second multi-microcomputer system MSY2 is of identical construction to the MSY1 system already described and contains a third microprocessor CP3 with an assigned DMA controller DC3, an input/output unit IO3, and a fourth microcomputer which is connected via the bus separator stages T41 and T42 and which contains a microprocessor CP4 and an associated read-write memory RAM4. The corresponding read-write logic circuits SL31 and SL41 are also provided. The data bus of the third microcomputer is referred to as DAB in FIG. 4, with the address bus referred to as ADB3. The corresponding buses of the fourth microcomputer are referred to as DAB4 and ADB4.

Data and address buses of the first and third microcomputers are connected to each other via a data bus separator stage TDA and via an address bus separator stage TAD. These separator stages, and the bus separator stages T21, T22, T41 and T42, are made conductive or blocking by a common control logic SLG. During the data exchange, a further separator stage TU connects a third memory read signal MR1 from the first DMA controller DC1 to an input of the third and fourth read-write logic circuits SL31 and SL41 of the second multi-microcomputer system MSY2.

During the data exchange, a further separator stage TU interconnects the memory read signal MR1 from the DMA controller DC1 to an input of the third and fourth read-write logic circuits SL31 and SL41 of the second multi-microcomputer system MSY2.

An AND gate U31 has inputs connected to the direct memory request output DMR1 of IO1, and the direct memory enable output DME3 of IO3. The output of gate U31 is connected to an input of an OR gate OR3, which corresponds to the OR gate OR1 in the first multi-microcomputer system MSY1. The output of the gate U31 is also connected as a further input to the third and fourth read-write logic circuits SL31 and SL41.

Both the multi-microcomputer systems MSY1 and MSY2 are identical in construction, although for reasons of clarity, not all of the circuit details of each system have been illustrated. Terminals bearing identical reference numerals are interconnected.

A data exchange which takes place from the second multi-microcomputer system MSY2 into the first multi-microcomputer system MSY1 takes place as follows. The microprocessor CP1 of the first microcomputer indicates the data exchange, by way of the DMA controller DC1. This can take place by software executed in the microprocessor CP1 or by a test device (not shown), for example, establishing an interrupt condition. Addresses required for the data exchange are transferred to the first DMA controller DC1 from the first microprocessor CP1, and then the DMA controller DC1 emits a HOLD request signal RE1 which switches the first and second microprocessors CP1 and CP2 into their HOLD state. The input/output unit IO1 produces a direct memory access request signal DMR1, which switches the two microprocessors CP3 and CP4 of the second multi-microcomputer system MSY2 into their HOLD state, via AND gate U31 and OR gate OR3. The DME3 input to the gate 31 is normally active, when the input/output unit IO3 is not producing a direct memory access request.

When all the microprocessors have been switched into their HOLD state, they each produce a HOLD acknowledge signal HA1–HA4 which are combined by AND gates U1, U3, and UG. The output of the gate UG is supplied through the HOLD logic unit SL1 to the HOLD acknowledge input of the direct memory access controller DC1, which informs the direct memory access controller that all processors occupy their HOLD state, and the second DMA controller DC3 is inactive, then the direct data exchange can commence.

All of the data buses are connected to each other by means of a common control logic unit SLG. Signals from SLG establish conductive connections among the data buses through T21, T22, T41, T42, TDA and TAD. Since the DMA controller DC3 is inactive, its ports connected to the address and data buses assume their high impedance state. The first DMA controller DC1 now controls the entire address bus of the two systems, and data can be transferred from the second into the first system. For this purpose, the DMA controller DC1 first applies the address of the source memory location which is to be read to the address bus, and by means of the signal MR1 reads out one byte from the third or fourth read-write store RAM3 or RAM4 into an intermediate source within the DMA controller DC1. Then, by means of the signal MW1, the same byte is entered, generally under the same address, into the first or second read-write store RAM1 or RAM2. The process is repeated until the desired items of data have been transferred from one read-write store into the other.

Following the transfer of the last byte, the HOLD request signal RE1 at the first output of the DMA controller DC1 is withdrawn, so that the microprocessors CP1 and CP2 of the first system again become operational. Furthermore, the direct memory access request signal DMR1 at the output of the input/output unit IO1 is cancelled, so that the microprocessors CP3 and CP4 of the second system MSY2 likewise become operational. The bus separation is restored, by the address bus separator stages TAD, TDA, T21, T22, T41, and T42. In this way, the two systems again become independent of each other, and the microcomputers of each system are also independent of each other.

A transfer from the first multi-microcomputer system MSY1 in the multi-microcomputer system MSY2 takes place in a similar manner, controlled by the second DMA controller DC3.

In the case of a faulty computer system, the normally active signals at the direct memory access outputs DME1 and DME3 of the input/output units IO1 and IO3 are withdrawn, which prevents the data exchange from taking place. In the case of temporary errors, however, such as parity failures, the enable signals DME1 and DME3 remain active, so that data can be exchanged between the two multi-microcomputer systems.

In FIG. 5, a clear view can be seen of portions of the first multi-microcomputer system MSY1 of FIG. 4. As in FIG. 2, the write direction signals W1R2 and W2R1 are produced by the input/output unit IO1. The corresponding outputs of the input/output unit IO1 are connected to inputs of an OR gate OR4 (corresponding to OR in FIG. 2), the output of which is connected to one input of an AND gate U2. The second input of the AND gate U2 is connected to the output of the first AND gate U1. The OR gate OR1 passes a HOLD request signal HR1 to the microprocessors CP1 and CP2, switching them into their HOLD states during data exchange between the two microcomputers belonging to one system. When this has been effected, the DMA controller DC1, as already described undertakes the data exchange between the read-write stores RAM1 and RAM2 of the same system.

The second input of the OR gate OR4 and the second input of the AND gate U11 have been left unconnected in FIG. 5 in order not to detract from its relationship with FIG. 4.

Each of the microprocessors described above operate in the conventional manner with respect to the HOLD request signals, the HOLD acknowledgement signals, etc. Also, the direct memory access controllers operate in the conventional way, under the control of the microprocessors. In addition, the input/output devices IO1 and IO3 operate in the conventional way to provide the output signals which have been described, in response to signals received from the microprocessors over the address and data buses. Accordingly, their operation is not described in detail herein.

The various bus separator stages, some of which are unidirectional, and others bidirectional as indicated in the drawings, represent conventional three state bus drivers or three state bidirectional bus drivers, which are commercially available. The remaining logic units represent conventional logic circuitry the structure of which is apparent to those skilled in the art from their functions described above. For example, the read-write logic unit SL1 simply gates together the MR1 and the W2R1 signals to provide the memory read signal MR for REM1, and gates together the two other inputs to provide the memory write signal MW for this unit.

Figure 6:
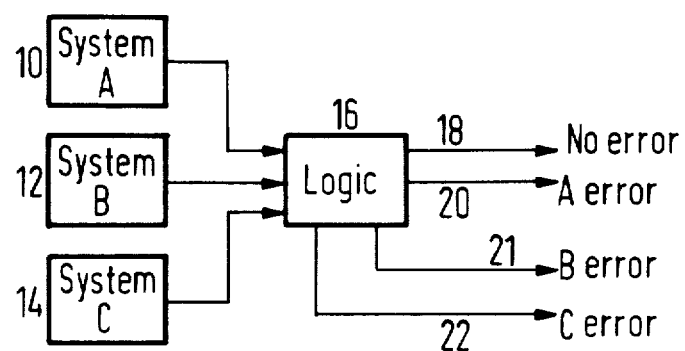
FIG. 6 is a functional block diagram of a multi-processing system including two redundant systems.

FIG. 6 represents a system incorporating three redundant microcomputer systems 10, 12, and 14, with logic apparatus 16 connected to each of the three systems, for verifying, by majority vote, that two of the redundant systems reach the same result, which is unaccepted as correct. An output is presented on Line 18 to indicate that all three systems are in agreement, and selected outputs are provided on lines 20–22 to indicate that one of the three systems is in disagreement with the other two. The details of the logic unit 16, to perform its intended function, could readily be designed by one skilled in the art, and so they need not be specifically described herein.

Figure 7:
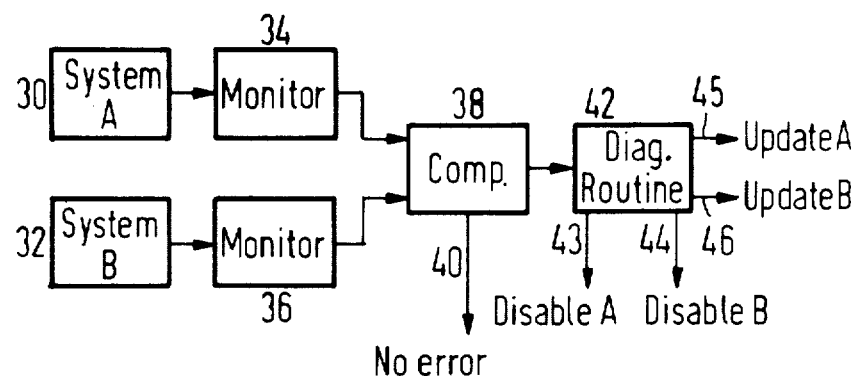
FIG. 7 is a functional block diagram of a multi-microcomputer system including two redundant systems and monitoring apparatus.

FIG. 7 illustrates a multi-microcomputer system having two redundant systems 30 and 32. Each is provided with a monitoring unit 34 and 36 respectively, which may be embodied either in hardware or software. The two monitoring units are connected to a comparator unit 38, and both of the monitoring units indicate proper operation of their respective systems, or indicate when the signals from the monitoring units are not consistent. When the monitoring units do not indicate any fault in operation, an output on a line 40 from the comparator 38 indicates that no fault has been recognized.

When a fault is recognized by the comparator unit 38, control is passed to a unit 42 which performs diagnostic routines to determine which of the systems is not functioning properly, and the nature of the error. If a serious error is detected in one of the systems, the unit 42 produces an output signal on either line 43 or 44, which disables the associated system. If the error is minor, such as a parity failure or the like, an output is produced on line 45 or 46 which passes control to a routine (now shown) for updating the suspect information from one system with correct information from the other.

From the above description, the construction and content of the comparator unit 38 and the control unit 42 can readily be constructed by those skilled in the art. The specific nature of the monitoring units 34 and 36 is determined by the functions which is it desired to monitor. In one case, the contents of the accumulator and flag registers of the microcomputers can be passed periodically by the monitoring units to the comparing unit 38. Alternatively, the monitoring units may monitor the time required for each system to perform the same operations, so that the comparator unit 38 can take note of any time differences.

The appropriate diagnostic routines represented by the block 42 in FIG. 7 also depend on the specific microprocessors which are used, and the type of errors which are monitored by the monitoring devices 34 and 36. A variety of diagnostic routines are well known to those skilled in the art, and the appropriate routines are used as necessary. It will be understood that the lines 40 and 43–46 may be embodied by either hardware output lines or software procedures.

As described above, it will be understood that when a serious error is recognized, through an output signal on lines 43 and 44, direct memory transfer between, for example, the two systems in FIG. 4 is inhibited. When a lesser error is recognized, normal operation can resume after the suspect information has been updated.

It will be apparent that various modifications and additions may be made in the apparatus of the present invention, without departing from the essential features of novelty thereof, which are intended to be defined and secured by the appending claims.

What is claimed is:

1. In a multi-microcomputer system having a plurality of microcomputers, each of said microcomputers having an individual read-write store, and being connected to an individual data bus and an individual address bus, the combination comprising;

a direct memory access controller connected directly to the data bus and address bus of a first of said microcomputers, a first plurality of bus separator stages, each being connected between the data bus of said DMA controller and the data bus of an individual one of said microcomputers, a second plurality of bus separator stages, each being connected between the address bus of said DMA controller and the address bus of an individual one of said microcomputers, control means connected to said first microcomputer and to all of said bus separator stages for selectively connecting the data and address buses of said DMA controller with the data and address buses of individual microcomputers, whereby the read-write stores of two microcomputers are interconnected by means of said bus separator stages and said buses and data exchange may take place between connected read-write memories via said DMA controller, and means connected between said microcomputers and said DMA controller for receiving memory read and memory write instructions from one of said microcomputers for controlling the direction of data exchange in response thereto.

2. Apparatus as claimed in claim 1, wherein more than two multi-microcomputer systems are connected in parallel via further system bus separator stages.

3. Apparatus according to claim 1, wherein said monitoring device selectively prevents data exchange between the two systems.

4. Apparatus according to claim 1, including a plurality of read-write logic circuits, one for the read-write store of each of said microcomputers, each of said read-write logic circuits producing a write command or a read command for operating its associated read-write store;

an output unit for producing signals representative of the direction of data exchange between said read-write stores; each of said read-write logic circuits being connected to receive said direction-representative signals, and connected to receive said memory read and memory write commands from said DMA controller and responsive to said signals and commands for operating its associated read-write store;

said DMA controller adapted to produce a HOLD request signal, means connected to said microcomputers for supplying said HOLD request signal to a HOLD input of each of said microcomputers for suspending operations of said microcomputer during data exchanges;

each of said microcomputers being adapted to generate a HOLD acknowledge output signal in response to recognition of a HOLD request signal, and a HOLD logic circuit connected to all of said microcomputers for receiving said HOLD acknowledge output signal, and connected to a plurality of said bus separater stages for triggering the data exchange.

5. Apparatus as claimed in claim 4, wherein said DMA controller is connected to said hold logic circuit to receive a HOLD acknowledge signal as an input, and including an AND gate connected between said read-write logic circuit and the HOLD acknowledge input of said DMA controller, and an OR gate connected between an input of said AND gate and said output unit.

6. Apparatus according to claim 1, wherein a pair of said multi-microcomputer systems are connected in parallel operating relationship with each having individual system bus;

a first microcomputer of each of said pair of multi-microcomputer systems having a direct memory access controller connected directly to its respective system bus;

a system bus separator stage for interconnecting the system buses of said pair of microcomputer systems; and a system logic circuit connected to the DMA controllers of both microcomputer systems and to said system bus separator stage for controlling the data exchange between the read-write stores of one multi-microcomputer system and the read-write stores of the other multi-microcomputer system in response to one of said DMA controllers while the other DMA controller is inactive.

7. Apparatus as claimed in claim 6, wherein said system logic circuit controls the data exchange between multi-microcomputer systems in response to the DMA controller of the multi-microcomputer system which receives data.

8. Apparatus according to claim 6, including monitoring devices connected with said multi-microcomputer systems and means connected to said monitoring devices and responsive to the occurrence of a fault, for initiating an exchange of data from the fault-free system into the faulty system.

9. Multi-microcomputer system as claimed in claim 1, wherein each of said read-write stores of each microcomputer within a multi-microcomputer system has a range of addresses not shared by the other read-write stores.

10. Apparatus as claimed in claim 6, wherein a first of said pair of microcomputer systems has a first input/output unit connected to the system bus of said first multi-microcomputer system, said second multi-microcomputer system being of identical construction with the first multi-microcomputer system and having a third microcomputer, a further DMA controlled assigned to said third microcomputer, a read-write store, a further input/output unit, and a fourth microcomputer with an associated fourth read-write store;

the data exchange from the second multi-microcomputer system into the first multi-microcomputer system being triggered by said first microprocessor of said first system via said first DMA controller and said first input/output unit;

and including means for placing all of said microcomputers in their HOLD state during said data transfer, means operative during a data transfer for rendering said further DMA controller inactive; an AND gate connected to receive signals representing that the data and address buses are interconnected and for supplying an operating signal to said first DMA controller whereby a data exchange is initiated in which the read-write stores of the first system receive a write signal.

* * * * *